United States Patent [19]
Messora

[11] 3,927,195
[45] Dec. 16, 1975

[54] PRODUCTION OF CAPSULES
[75] Inventor: Edoardo Messora, Rome, Italy
[73] Assignee: Lilly Industries Limited, London, England
[22] Filed: Jan. 31, 1974
[21] Appl. No.: 438,490

[52] U.S. Cl. .................. 424/21; 29/428; 53/266; 206/528; 220/8; 424/35; 424/37
[51] Int. Cl.² .................................. A61K 9/48
[58] Field of Search ........ 424/37, 21, 35; 53/266; 206/437, 84, 528; 220/8

[56] References Cited
UNITED STATES PATENTS
| | | | |
|---|---|---|---|
| 1,690,760 | 11/1928 | Volwiler | 424/21 |
| 2,491,475 | 12/1949 | Bogin | 424/21 |
| 3,173,840 | 3/1965 | Hostetler | 206/1 |

*Primary Examiner*—Shep K. Rose
*Attorney, Agent, or Firm*—Ralph W. Ernsberger; Everet F. Smith

[57] ABSTRACT

Capsule comprising a body having a closed-end wall and a side wall having a generally cylindrical open-end portion, and a cap having a closed-end wall and a generally cylindrical side wall closely telescopically received over the open end of the body, said body and cap being separable and re-closable after manufacture so as to enable a product to be inserted into said body, the walls of said body and cap being composed of two layers, the materials constituting said layers being soluble at pH ranges which are different but overlapping. A method for producing such capsules is also described.

5 Claims, 3 Drawing Figures

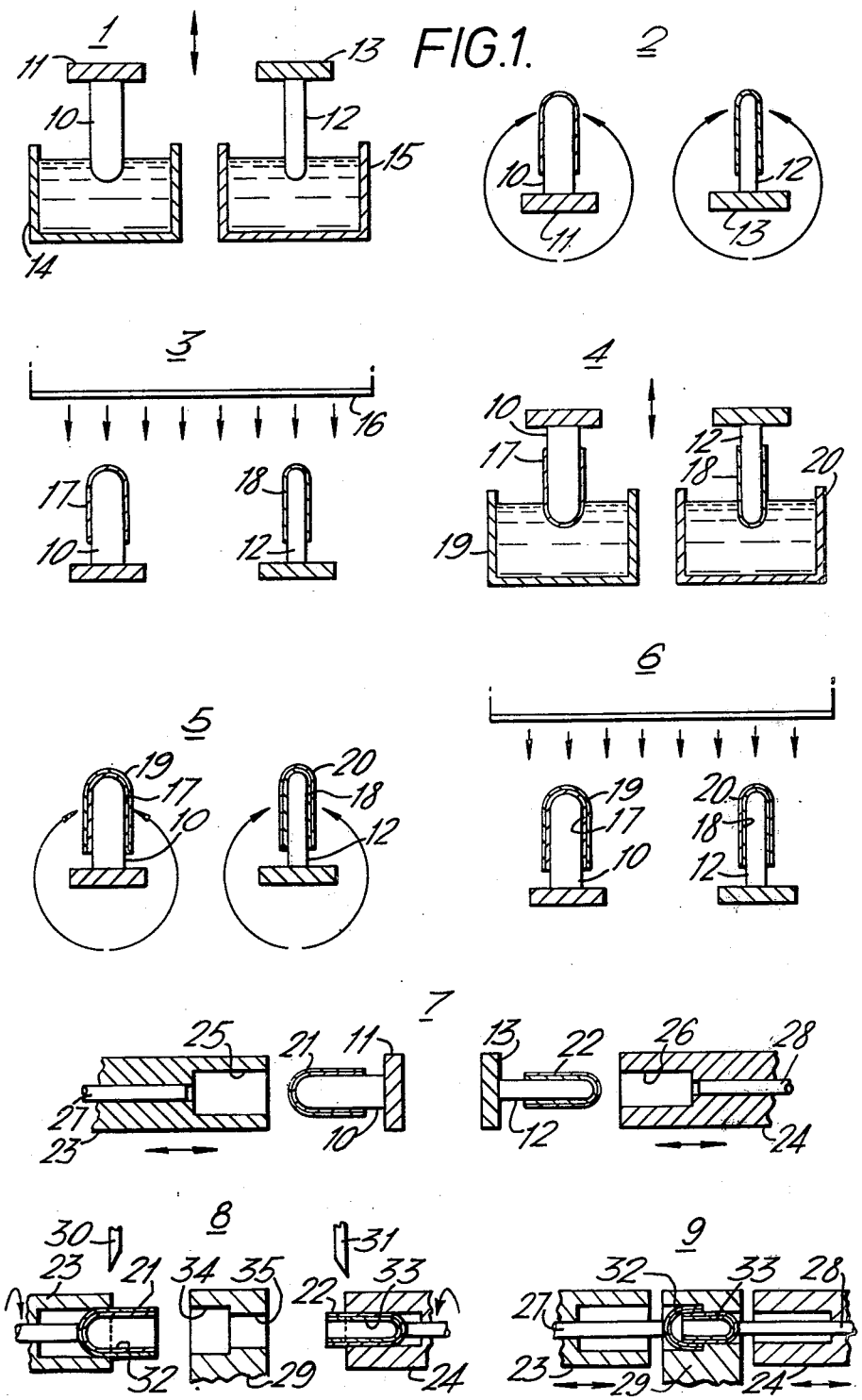

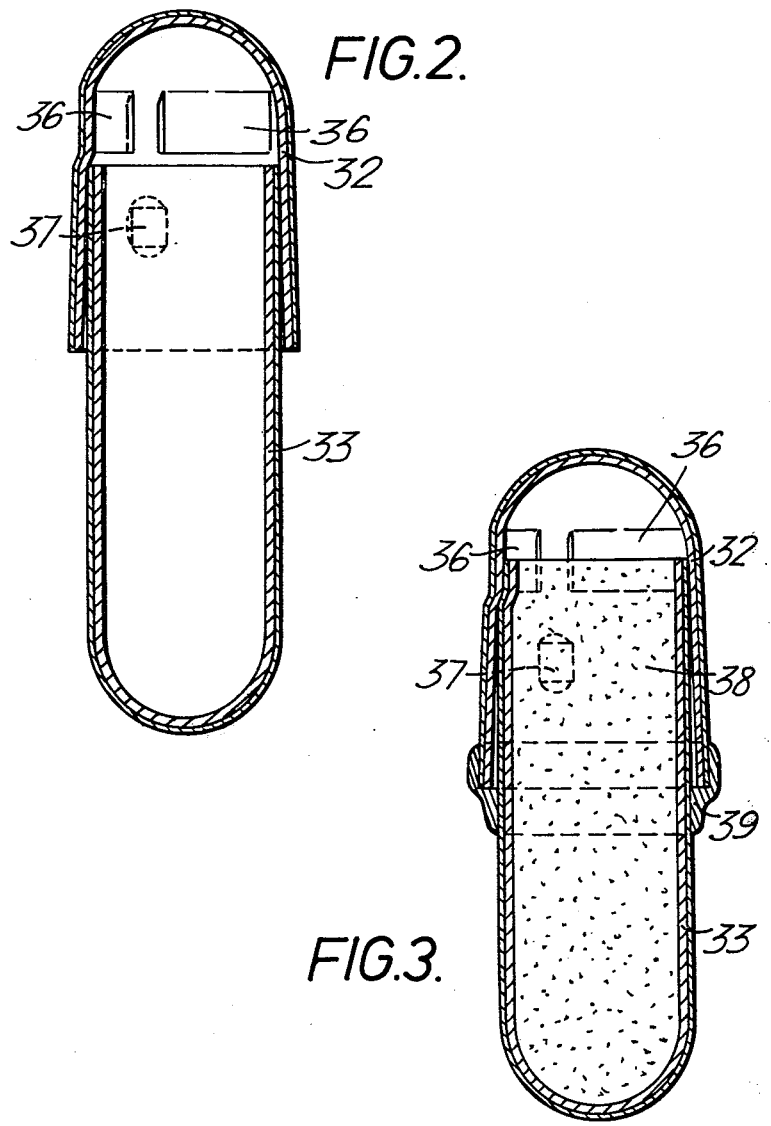

PRODUCTION OF CAPSULES

The present invention is concerned with improvements in capsules of the hard gelatin type and more especially with providing a method by which the solubility characteristics of such capsules may readily be adapted during the production of the empty capsule shells.

Two part capsules made of gelatin or, less commonly, of some other readily soluble film-forming material such as a modified cellulose derivative, have gained wide acceptance in industry as a means of enclosing small unit quantities of materials, such as chemicals and especially pharmaceuticals, which are to be released into an aqueous medium by dissolution of the surrounding capsule shell. However, because of the solubility characteristics of such capsules, they cannot be used in circumstances where it is desired that the contents of the capsules should only be released in a medium of a particular pH. For example, the conventional hard gelatin capsule cannot be used as a means for orally administering a pharmaceutical intended for release in the intestine (pH ranging from 3.5 to 8.0) since the capsule must first pass through the stomach, where it would quickly be dissolved by the gastric juices (pH 1.2 to 3.5) thus releasing the drug prematurely.

A number of methods have been proposed in the literature to overcome this problem. In the case of gelatin capsules, one proposed method has been to harden or mature the gelatin shell by treatment with formaldehyde. Although this process has been used for many years, it is well known that it is extremely difficult to remove all of the excess formaldehyde used in the treatment and that the formaldehyde remaining continues to react causing the capsule to become less soluble as storage times increase. Additionally, since treatment with formaldehyde can cause distortion of the capsule wall, it is inadvisable to apply the method to empty capsules since any distortion of the capsule will cause serious filling problems. Conversely, if filled capsules are treated and the resultant capsules become too insoluble, they have to be destroyed with the consequent loss of the contents which, in many cases, will be a relatively expensive drug.

To avoid this latter problem, it has been suggested to include various cellulose derivatives in the gelatin solution used for producing the empty capsules so as to decrease the rate of dissolution of the gelatin in acidic solutions. However, due to the incorporation of these substances, the resultant gelatin film is stressed, causing it to be extremely brittle which in turn results in problems when the capsule is stripped from the pins on which it is formed and cut to the required size. These problems are so apparent on modern high-speed capsule producing machinery as to render this method impractical.

Another method used to decrease the solubility of capsules is to coat the capsules, after they have been filled and banded, with a material having the desired solubility characteristics. However, where large scale production is involved, a number of problems arise with this method such as incomplete coverage of the capsule with the coating material, inadequate adherence of the coating due probably to the smoothness and flexibility of the capsule wall, and the formation of cracks in the coating which eventually peels off. Furthermore, this method has the disadvantage of requiring the capsule filler to add a further operation into the production sequence and, when the aforementioned problems occur, results in filled capsules having to be destroyed with the consequences mentioned above.

It is therefore an object of the present invention to provide an empty capsule of the hard gelatin type having controlled solubility characteristics, which is capable of production at relatively high speeds, which can be filled and banded on conventional machinery and which requires no further treatment after the latter operation. It is also an object of the present invention to provide a capsule which is insoluble in solutions having a pH less than 3.5.

A further object of the present invention is to provide a method by which such capsules may be manufactured.

According to the present invention therefore, there is provided a capsule comprising a body having a closed-end wall and a side wall having a generally cylindrical open-end portion, and a cap having a closed-end wall and a generally cylindrical side wall closely telescopically received over the open end of the body, said body and cap being separable and re-closable after manufacture so as to enable a product to be inserted into said body, the walls of said body and cap being composed of two layers, the materials constituting said layers being soluble at pH ranges which are different but overlapping.

The preferred application of the capsule of this invention is in the field of pharmaceuticals and, in this case, the inner of the two layers comprising the walls of the capsule is formed of a material which is soluble in solutions of acidic and basic pH whilst the outer of the two layers is formed of a material which is only soluble in solutions of pH greater than 3.5. It will be apparent that, upon oral administration to a human of a drug contained in such a capsule, the drug will not be absorbed in the stomach because the outer layer of the capsule wall is insoluble at the pH levels prevailing in the stomach and will not dissolve. However, on passage of the capsule into the intestine where the pH is greater than 3.5, both the outer and inner layers of the capsule wall will dissolve releasing the drug contained in the capsule.

In the aforementioned embodiment of the present invention, the inner layer of the capsule wall preferably has a double wall thickness of from 0.10 to 0.20 mm. and is normally made of gelatin which optionally may contain preservatives such as sodium metabisulphite, plasticisers such as glycerine and sorbitol, and dyes or pigments. Other materials such as calcium alginate, and modified cellulose drivatives, for example methyl cellulose and hydroxyalkyl-alkyl cellulose ethers, can of course be used for the production of the inner layer. The outer layer of the capsule wall preferably has a double wall thickness of from 0.020 to 0.060 mm. and is composed of a material which is substantially insoluble at pH values less than 3.5. Many such materials are available as articles of commerce but, for the purposes of the present invention, it is preferred to use film-forming materials such as salol, benzoin, n.butyl stearate, carnuba wax, shellac or mixtures thereof or, most advantageously, a synthetic film-forming material such as a methacrylic acid polymer, a carboxyvinyl polymer, a partial ester of a maleic anhydride/vinyl alkyl ether or maleic anhydride/alkene copolymer, hydroxypropyl methyl cellulose phthalate, cellulose benzoacetate, or a cellulose acetate phthalate. To such film-forming materials, there may be added plasticisers such as diethyl phthalate, dibutyl phthalate, paraffin oil, corn oil, propylene glycol, dioctylsulphosuccinate and triacetin.

As drugs which can be usefully administered in the enteric capsules described above, there may be mentioned gastric irritants such as chloride and iron salts, e.g. ammonium, potassium, sodium and cobalt chloride, and ferrous sulphate, gluconate and fumarate, as well as many acidic anti-inflammatory drugs, for example aspirin, flufenamic acid, phenylbutazone, and indomethacin, gastric degradable drugs such as erythromycin, carbenicillin and glandular products, for example pancreatin, and gastric nauseants such as emetine, probenecid, diethyl stilbestrol, prednisolone, and atabrine, as well as drugs intended to act in the intestine such as bephenium hydroxynaphthoate, dichlorophen, dithiazine, niclosamide, piperazine, thiabendazole, niridazole, bisacodyl, methenamine, potassium permanganate, sodium cromoglycate, sulphasalazine, sulphadimidine, phthalylsulphathiazole and sodium carbenoxolone. After filling of such drugs into the enteric capsules of the present invention, the junction of the cap and body of the capsules is sealed by applying thereto a circumferential band which will normally be the same material as that forming the outer layer of the capsule wall or, if not the same, will be of a material which is only soluble in solutions of pH greater than 3.5. Such sealed enteric capsules form a part of this invention.

Other uses for the capsules of the present invention include the enclosure of catalysts, the release of which is required at a particular pH dependent stage of a chemical reaction, and the enclosure of additives such as water or fabric softeners which are to be released at a certain stage in the cycle of an automatic washing machine. In such applications, the materials constituting the inner and outer layers of the capsule walls are so chosen that both are soluble at the pH at which the contents of the capsule are to be released whilst the outer layer is insoluble at the pH values prevailing in the chemical reaction or washing cycle prior to the release time. Use of such capsules is particularly advantageous where the contents of the capsule are chemically or physically incompatible with the outer layer material which cannot therefore be used alone to form the capsule. The capsules of the present invention are also useful in that they permit the use in capsule manufacture of film-forming materials with desirable solubility characteristics but which do not form a sufficiently rigid film to enable the capsule to be manufactured entirely from such materials. In the capsules described above, the necessary rigidity is provided by suitable choice of the material constituting the inner layer of the capsule wall.

According to a further feature of the present invention, there is provided a method for manufacturing a capsule of the type described above, characterised by the steps of:

i. dipping a capsule body pin and a capsule cap pin into a solution of a first film-forming material to a pre-determined depth;
ii. withdrawing said pins and allowing the adherent layer of said first film-forming material to set;
iii. partially or wholly drying the first adherent layer on said pins;
iv. re-dipping said pins into a solution of a second film-forming material in which said first film-forming material is substantially insoluble, said first and second film-forming materials being soluble at pH ranges which are different but overlapping;
v. withdrawing said pins and allowing the adherent layer of said second film-forming material to set;
vi. partially or wholly drying the second adherent layer on said pins;
vii. pulling or stripping the resultant two-layer body and cap shells from their respective pins, said body and cap shells each having a closed-end wall and a generally cylindrical open-end portion;
viii. cutting said body and cap shells to the desired length; and
ix. sliding said cap shell telescopically over the open-end portion of said body shell.

In steps (i) and (iv), the viscosity of the solutions is the main factor in determining the thickness of the film adhering to the pins. Whilst the thickness of the film is not critical, it is desirable to produce capsules which can readily be handled on conventional capsule filling machinery. To achieve this, therefore, the viscosity of the solution in step (i) is preferably adjusted so as to give a double wall thickness of from 0.10 to 0.20 mm. whilst the viscosity of the solution in step (iv) is adjusted to give a double wall thickness for the outer layer of from 0.020 to 0.060 mm. These dimensions can be varied beyond the limits specified but desirably the double wall thickness of the finished capsule should be from 0.15. to 0.25 mm.

With regard to step (iii), it is possible to continue the process on to the next stage after only minimal drying, i.e. as soon as the first layer is adequately set. However, it is preferable to continue step (iii) until the first layer is substantially dry to ensure that the eventual stripping operation can be carried out without deformation or cracking of the film. For example, if the first film-forming material is gelatin, step (iii) would normally be continued until the moisture content of the gelatin was between 10 and 20 percent.

According to another feature of the present invention, there is provided a method for manufacturing a two-part hard gelatin capsule resistant to dissolution in gastric juices, characterised by the steps of:

a. dipping a capsule body pin and a capsule cap pin into a solution of gelatin to a pre-determined depth;
b. withdrawing said pins and allowing the adherent gelatin film to set;
c. partially or wholly drying the gelatin film on said pins;
d. re-dipping said pins into a solution of a film-forming material in which the gelatin film is substantially insoluble, said film-forming material being resistant to dissolution at pH values less than 3.5 but being soluble at higher pH values;
e. withdrawing said pins and allowing the resultant outer film of said film-forming material adhering to the inner gelatin film on said pins to set;
f. partially or wholly drying the said outer film;
g. pulling or stripping the resultant two-layer body and cap shells from their respective pins, said body and cap shells each having a closed end wall and a generally cylindrical open-end portion;
h. cutting said body and cap shells to the desired length; and i. sliding said cap shell telescopically over the open end portion of said body shell.

In step (a) above, an aqueous solution of gelatin will normally be used, the solution optionally containing a preservative such as sodium metabisulphite, a plasticiser such as glycerine or sorbitol, dyes and pigments. To permit capsule bodies and caps of different colours to be produced, the capsule body and cap pins can be dipped in separate tanks containing appropriately coloured gelatin solutions. As stated previously, it is desirable that the empty capsules produced by the method of this invention should be capable of being handled on conventional capsule filling machinery. To this end, standard sizes and shapes of capsule body and cap pins will normally be used so as to provide capsules having the usual internal dimensions and optionally possessing one or more pre-locking and/or locking means such as those described in United Kingdom Patent Specifications Nos. 970,761, 1,040,859, 1,108,629 and 1,302,343.

To keep the external dimensions of the capsules within the limits necessary for filling in existing machines, the viscosity of the gelatin solution is adjusted to a level lower than that used in the manufacture of ordinary gelatin capsules so as to obtain a double wall thickness for the gelatin film of from 0.10 to 0.20 mm., preferably 0.13 to 0.18 mm., and in step (d) the viscosity of the solution of the film-forming material is such as to give a double wall thickness for the outer layer of from 0.020 to 0.060 mm., preferably 0.030 to 0.050 mm. Advantageously the outer layer comprises a synthetic film-forming material such as those mentioned above, especially the methacrylic acid polymers sold under the trade name Eudragit, the carboxyvinyl polymers sold under the trade name Gelva, a $C_{2-7}$ alkyl partial ester of an ethylene/maleic anhydride or vinyl methyl ether/maleic anhydride copolymer, cellulose acetate phthalate, cellulose benzoacetate or hydroxypropyl methyl cellulose phthalate.

Although not normally necessary, steps (iv) and (d) of the aforementioned methods may be preceded by dipping the pins in a solution of a substance, for example diethyl or dibutyl phthalate, which will promote adhesion of the inner and outer layers. Additionally, if desired, steps (iv) to (vi) and (d) to (f) may be repeated in order to build up the thickness of the second layer or to add a further layer of another suitable film-forming material.

According to a further feature of the present invention, there is provided a method of encapsulating pharmaceutical preparations in capsules produced by the method defined in steps (a) to (i) above, which method comprises separating the body and cap of said capsules, placing the preparation in the body, re-fitting the cap to the body and sealing said cap and body together by applying a circumferential band to the external junction thereof, said band being comprised of the same material which constitutes the outer layer of the capsule wall or another material which is resistant to dissolution at pH values less than 3.5.

The invention is further illustrated by reference to the accompanying drawings in which:

FIG. 1 is a schematic diagram illustrating the method of the present invention;

FIG. 2 is a longitudinal section, on an enlarged scale, of an empty capsule embodying the invention; and FIG. 3 is a longitudinal section, also on an enlarged scale, of a filled and sealed capsule embodying the invention.

In stage 1 of the method of making capsules illustrated in FIG. 1, a plurality of capsule cap pins 10 on a bar 11 and a corresponding number of capsule body pins 12 on a bar 13 are dipped to a pre-determined depth into tanks 14 and 15 containing an aqueous solution of gelatin. In stage 2, the pins 10 and 12 are withdrawn from tanks 14 and 15, and bars 11 and 13 are intermittently rotated whilst the coating of gelatin on pins 10 and 12 sets. Thereafter, in stage 3, the coating is partially or wholly dried on the pins, for example by passage of air over the pins from an air chamber 16. This forms a layer 17 of gelatin on cap pin 10 and a layer 18 of gelatin on body pin 12. In stage 4, pins 10 and 12 with their adhered layers 17 and 18 are re-dipped in tanks 19 and 20 containing a solution of cellulose acetate phthalate (C.A.P.) in acetone/ethanol or a solution of another suitable film-forming material which is resistant to dissolution at pH values less than 3.5. The depth of dip in this stage is normally marginally less than in the gelatin tanks to ensure ease of stripping in stage 7 described below.

Stages 5 and 6 are then carried out, repeating the operations of stages 2 and 3, to form a two-layer cap shell comprising an outer layer 19 of C.A.P. adhered to the inner layer 17 of gelatin on cap pin 10 and a two-layer body shell comprising an outer layer 20 of C.A.P. adhered to the inner layer 18 of gelatin on body pin 12.

The bars 11 and 13 carrying the two-layer shells 21 and 22 on their pins 10 and 12 are then positioned between groups of stripping collets 23 and 24 for stripping in stage 7. The collets 23 and 24 traverse inwardly to receive the shells 21 and 22 in cavities 25 and 26, to a distance regulated by the movement of the collets and by the positioning of plungers 27 and 28 in the collets. With the collets advanced to the desired position, gripping means (not shown) in the collets engages the shells to retain them in cavities 25 and 26, and the collets then retract thus stripping the shells 21 and 22 from their pins 10 and 12.

In stage 8, the bars 11 and 13 are then removed and a capsule assembly means 29 is positioned between the collets. The collets 23 and 24 are rotated, and knives 30 and 31 are brought forward to trim the shells 21 and 22 to the desired length, leaving a two-layer capsule cap 32 in collet 23 and a two-layer capsule body 33 in collet 24. The capsule assembly means 29 contains shouldered apertures, each including a large bore 34 to receive a capsule cap and a small guide bore 35 to receive and guide the capsule body.

In stage 9, the collets 23 and 24 are advanced towards the capsule assembly means 29 and aligned with the aperture 34–35. The plungers 27 and 28 are also moved forward in sequence to push the cap 32 from collet 23 into bore 34 and against the shoulder at its inner end, and to push the capsule body 33 from collet 24 into and through the guide bore 35 into telescopic assembly with the cap 32. The assembled empty two-layer capsule, one form of which is illustrated in FIG. 2, is then discharged from aperture 34–35 by retracting collet 23 and plunger 27 and further advancing plunger 28.

In the capsule illustrated in FIG. 2, the body 33 is formed on a stainless steel pin of conventional type, having a generally cylindrical but draft-tapered side surface which merges at its upper end with a hemispherical end surface. The draft taper may be of the order of 0.1 to 0.2 mm. per centimeter, i.e. the diameter of the pin is reduced towards its end surface by from 0.1 to 0.2 mm. per centimeter of pin length. The cap 32 has three inwardly raised lands 36, each extending through approximately 90° of arc circumferentially of the cap and two further inwardly raised lands 37 diametrically opposed to each other and formed approximately midway along the side wall of the cap. Such a cap is formed on a pin of the type described in United Kingdom Patent Specification No. 970,761 but modified by the provision of two further depressions in the surface of the pin corresponding to the desired lands 37. As shown in FIG. 2, the inner faces of lands 37 but not of lands 36 are in gripping engagement with the outer face of the capsule body 33, the assembly of the empty capsule in this position being controlled by the length of stroke of plunger 28 in the assembly method described above. The size and shape of lands 37 are such as to grip the body 33 to a degree sufficient to prevent separation of the capsule cap and body during subsequent packing and handling whilst at the same time permitting the cap and body to be readily separated in conventional filling machinery.

In the filling operation, the assembled empty capsule is fed to a filling unit which separates the cap 32 from the body 33, for example by suction, the body is then filled with material 38, the cap and body reassembled as shown in FIG. 3 with the body 33 in conforming gripping engagement with the lands 36 and sealed to the cap 32 by a band 39 which is either of the same material as that which constitutes the outer layer of the capsule or of another suitable film-forming material having the required solubility characteristics. It will of course be appreciated that, as the filled capsules of the invention are to be sealed by band 39, the separation resistance imparted by the lands 36 is only of advantage when the filled capsules are subjected to considerable further handling operations prior to banding.

The following Examples illustrate dipping solutions suitable for use in stage 4 of the method described above and the preparation of capsules using such solutions:

Example 1
| | | |
|---|---|---|
| Cellulose acetate phthalate: | | 750 g. |
| Diethyl phthalate: | | 185 g. |
| Acetone: | | 2 l. |
| Ethyl alcohol: | to | 5 l. |

Example 2
| | | |
|---|---|---|
| Hydroxypropyl methyl cellulose phthalate: | | 280 g. |
| Dibutyl phthalate: | | 30 g. |
| Methylene dichloride: | | 500 ml. |
| Methanol: | to | 2 l. |

Example 3
| | | |
|---|---|---|
| Half ethyl ester of a copolymer of polyvinyl methyl ether/maleic anhydride: | | 320 g. |
| Isopropanol: | | 250 ml. |
| Acetone: | to | 2 l. |

EXAMPLE 4

Size 0 capsules were prepared by the above method using in stage 1 an aqueous solution of gelatin of such a viscosity as resulted in a double-wall thickness for the gelatin layer of 0.13 to 0.15 mm. and using in stage 4 the cellulose acetate phthalate solution of Example 1. The resultant capsules were divided into two batches, one batch being filled with the following erythromycin formulation:

| | Per Capsule |
|---|---|
| Erythromycin: | 250 mg. |
| Talc: | 220 mg. |
| Magnesium stearate: | 5 mg. | and the other batch being filled with a pancreatin formulation as follows:

| | Per Capsule |
|---|---|
| Pancreatin: | 400 mg. |
| Dimethylpolysiloxane: | 40 mg. |
| Starch: | 107.5 mg. |
| Aerosil '200' | 2.5 mg. |

After filling both batches of capsules were sealed by application of a band of cellulose acetate phthalate and then tested according to the British Pharmacopoeia (1968) test for enteric coated capsules. Briefly, in this test, the capsules were agitated (30 shakes per minute) for 3 hours in a solution of 0.6% hydrochloric acid, pH 1.2, at 37°C. No disintegration of the capsules occurred. They were then washed and agitated in a pH 6.8 buffer solution. After 20 minutes, the capsules were completely disintegrated thus satisfying the test criteria. Similarly, the capsules did not disintegrate after one hour in simulated gastric fluid of pH 2.26 but were completely dissolved within 22 minutes in simulated intestinal fluid of pH 7.50, thus satisfying the criteria laid down in the United States Pharmacopoeia XXVIII.

EXAMPLE 5

Size 1 capsules were prepared by the method described above, the inner layer of the capsule wall being of gelatin and the outer layer being of hydroxypropyl methyl cellulose phthalate, the latter being obtained by using a solution according to Example 2 in stage 4 of the production method. The resultant capsules were filled with the following formulation:

| | Per Capsule |
|---|---|
| Acetylsalicyclic acid: | 300 mg. |
| Starch: | 150 mg. | and then sealed by banding with a band of hydroxypropyl methyl cellulose phthalate. Capsules prepared in this manner satisfactorily passed the B.P. and U.S.P. tests described in Example 4.

EXAMPLE 6

Size 3 capsules were prepared by the method hereinbefore described, the inner layer of the capsule wall being of gelatin and the outer layer being formed by the use, in stage 4 of the method, of the solution described in Example 3. The capsules were filled with the following composition:

| | Per Capsule |
|---|---|
| Indomethacin: | 25 mg. |
| Lactose: | 213.5 mg. |
| Magnesium stearate: | 1.5 mg. | and sealed with a band of the ½ ethyl ester of a copolymer of polyvinyl methyl ether and maleic anhydride. The resultant sealed capsules satisfactorily complied with the standards laid down in the B.P. and the U.S.P. tests described in Example 4.

I claim:

1. An empty and reclosable two-piece capsule comprising, assembled together, unsealed, a body having a closed end wall and a side wall having a generally cylindrical open end portion, and a cap having a closed-end wall and a generally cylindrically side wall closely telescopically received in conforming gripping engagement over the open end of the body, said body and cap being free from conforming gripping engagement lands or circumferential seals or bands at the junction of the cap and body composed of two layers, the material constituting the inner of the two layers being gelatin and the outer of the two layers being a material which is only soluble at a pH greater than 3.5.

2. Capsule as claimed in claim 1, wherein said outer layer comprises a film-forming material selected from salol, benzoin, n-butyl stearate, carnuba wax, shellac or mixtures thereof.

3. Capsule as claimed in claim 1, wherein said outer layer comprises a synthetic film-forming material selected from methacrylic acid polymers, carboxyvinyl polymers, partial esters of maleic anhydride/vinyl alkyl ether and maleic anhydride/alkene copolymers, hydroxypropyl methyl cellulose phthalate, cellulose benzoacetate and cellulose acetate phthalate.

4. Capsule as claimed in claim 1 wherein said gelatin inner layer has a double wall thickness of 0.10 to 0.20 mm, and said outer layer has a double wall thickness of from 0.02 to 0.06 mm and is made of a synthetic film forming material as defined in claim 5.

5. Capsule as claimed in claim 4, wherein said film-forming material is cellulose acetate phthalate.

* * * * *

UNITED STATES PATENT AND TRADEMARK OFFICE
CERTIFICATE OF CORRECTION

PATENT NO. : 3,927,195
DATED : December 16, 1975
INVENTOR(S) : Edoardo Messora

It is certified that error appears in the above—identified patent and that said Letters Patent are hereby corrected as shown below:

Column 2, line 40, change the spelling of capusle to capsule.

Column 2, line 43, change the spelling of capusle to capsule.

Column 10, claim 4, line 14, change the number 5 to number 3.

Signed and Sealed this

Eighteenth Day of January 1977

[SEAL]

Attest:

RUTH C. MASON
Attesting Officer

C. MARSHALL DANN
Commissioner of Patents and Trademarks